Feb. 1, 1944.  H. F. MORLEY ET AL  2,340,403
SPEED AND BRAKING DISTANCE INDICATOR
Filed Dec. 11, 1939  4 Sheets-Sheet 2
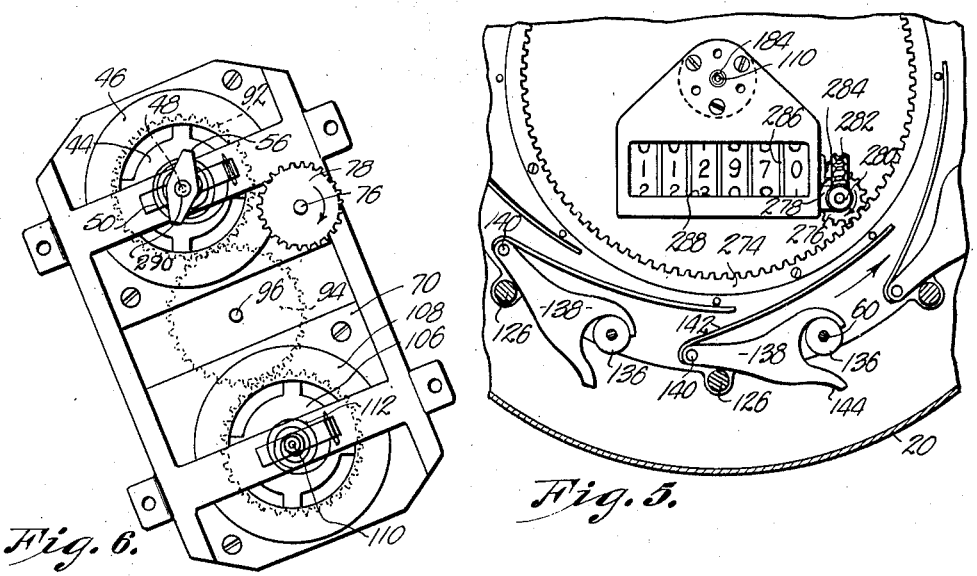
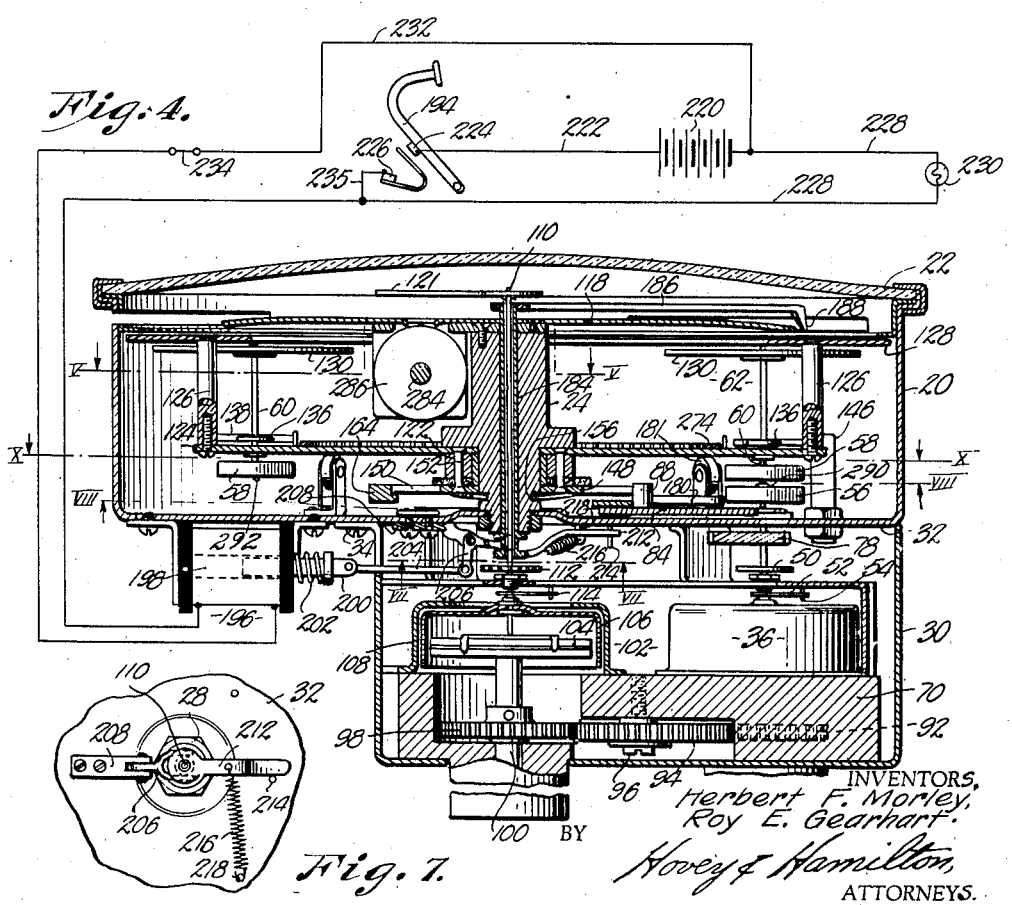
INVENTORS,
Herbert F. Morley,
Roy E. Gearhart.
BY Hovey & Hamilton
ATTORNEYS.

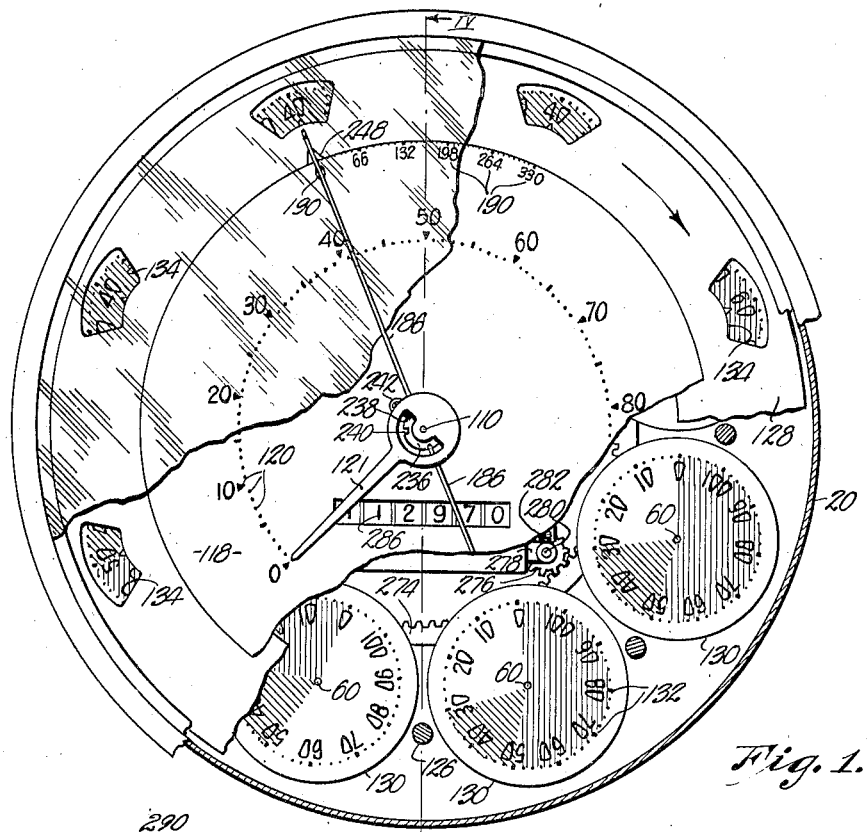

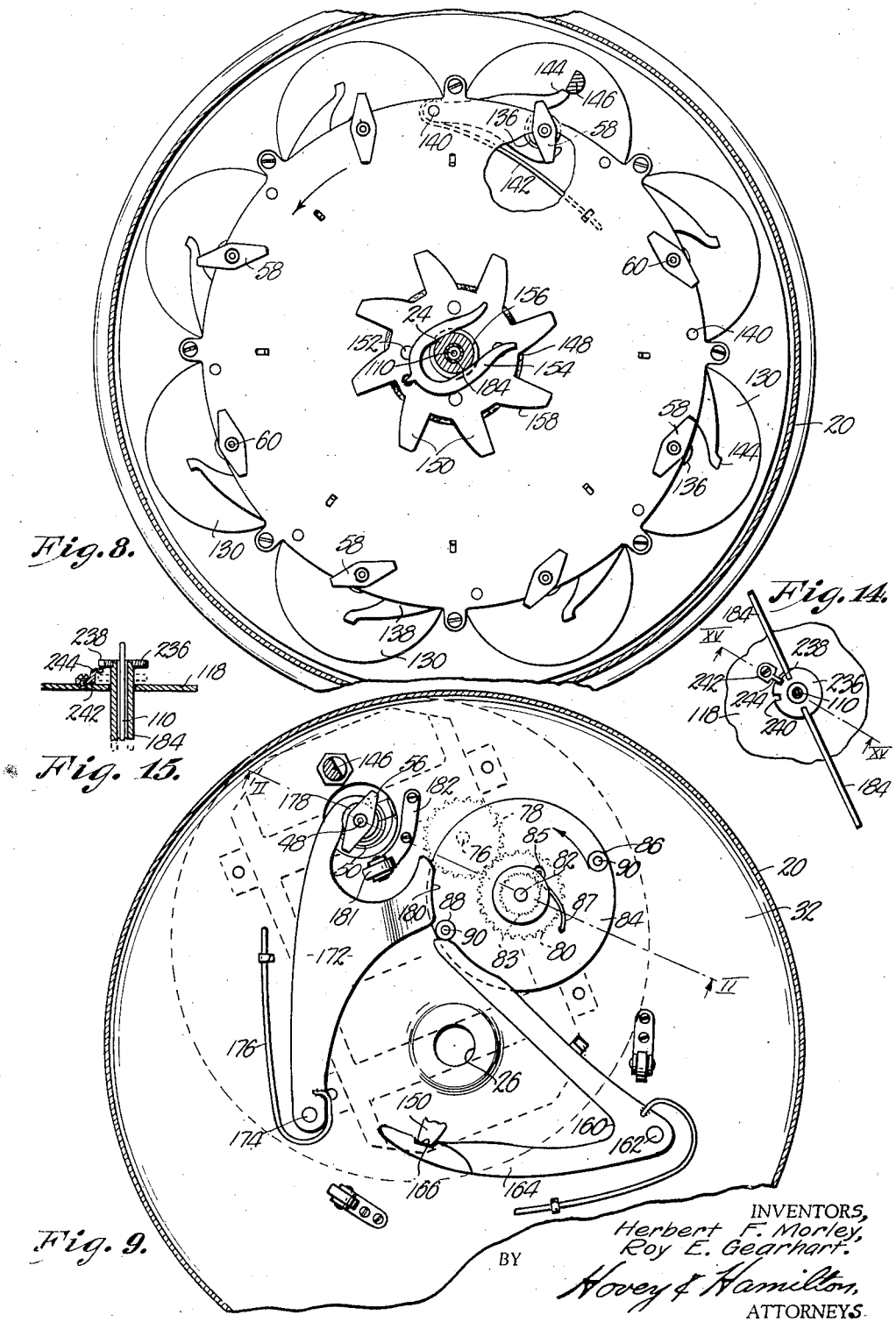

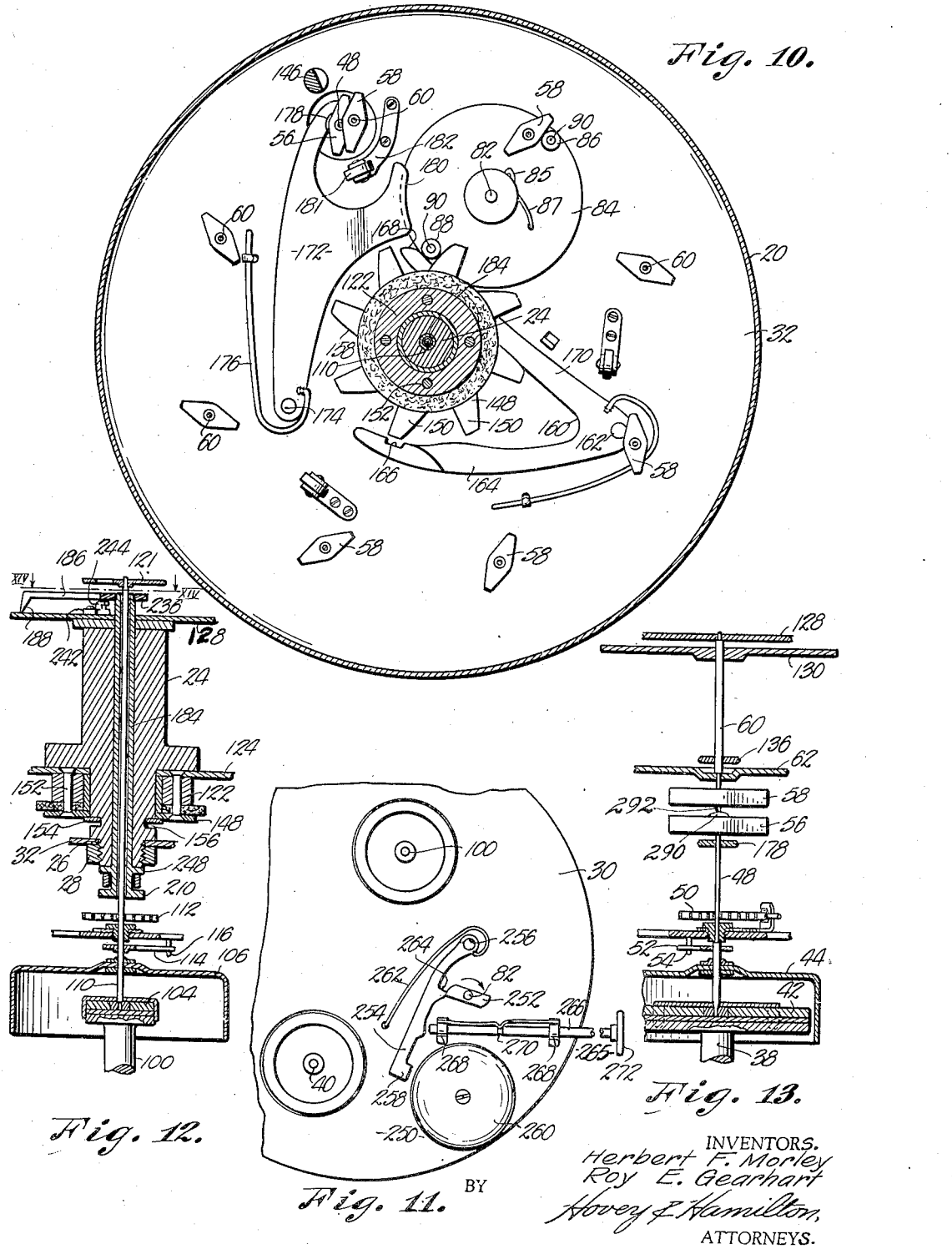

Patented Feb. 1, 1944

2,340,403

UNITED STATES PATENT OFFICE 2,340,403

SPEED AND BRAKING DISTANCE INDICATOR

Herbert F. Morley and Roy E. Gearhart, Kansas City, Mo.

Application December 11, 1939, Serial No. 308,620

3 Claims. (Cl. 73—51)

This invention relates to improvements in speed and braking distance indicators for automobiles and particularly to devices whereby the ground speed of an automobile is indicated at spaced intervals for a predetermined distance last traveled, as is also the distance required to stop the automobile after setting the brakes.

This invention is an improvement over our pending application Serial No. 272,252, which has matured into Patent No. 2,270,599 with the added feature of means for indicating the distance required to stop the automobile after the brake is first set.

In the operation of an automobile, it is very important for safe driving, to know the distance required to stop the automobile from a predetermined speed of travel.

It is the principal object of the present invention to provide a speed and braking distance indicator in combination with a magnetic speedometer, having a magnet rotor shaft and a drag element shaft whereby a series of circumferentially disposed indicating members are rotated intermittently by said magnet rotor shaft, and means operated by said intermittently rotated series whereby the distance required to stop the vehicle by braking is indicated.

Another object of this invention is the provision of an instrument whereby the distance required to stop the automobile is indicated, as is also the ground speed of the automobile at the time the brake was set.

A further object of this invention is the provision of an indicator whereby a magnetic drag unit responsive to the ground speed of the automobile operates to control means whereby the distance required to stop the automobile, by means of its brakes, from an indicated ground speed, is indicated.

With these as well as other objects, which will appear during the course of the specification in view, reference will now be had to the drawings wherein:

Fig. 1 is a plan view of a past speed and braking distance indicator for automobiles, partly broken away to show different parts embodying this invention.

Fig. 2 is a fragmentary sectional view taken on line II—II of Fig. 9.

Fig. 3 is a fragmentary sectional view taken on line III—III of Fig. 2.

Fig. 4 is a vertical sectional view taken on line IV—IV of Fig. 1, with a diagrammatic showing of the circuit connected therewith.

Fig. 5 is a fragmentary sectional view taken on line V—V of Fig. 4.

Fig. 6 is a plan view of the magnetic drag unit assembly.

Fig. 7 is an inverted sectional plan view taken on line VII—VII of Fig. 4.

Fig. 8 is an inverted plan view taken on line VIII—VIII of Fig. 4.

Fig. 9 is a fragmentary plan view, partly in section, showing the braking and operating means for the star wheel and associated parts.

Fig. 10 is a sectional view taken on line X—X of Fig. 4.

Fig. 11 is an inverted plan view of a portion of the secondary housing carrying the bell ringing device.

Fig. 12 is an enlarged sectional view of the drag cup and parts associated therewith.

Fig. 13 is an enlarged sectional view of the magnetic drag cup and associated parts to indicate the current speed on a rotatable disc.

Fig. 14 is an enlarged view of the upper end portion of the drag cup shaft 110 and its associated parts; and, Fig. 15 is a section taken on line XV—XV of Fig. 14.

Throughout the several views, like reference characters designate similar parts and the numeral 20 is a housing of substantially cylindrical form open at one side and provided with a transparent cover member 22, through which the operator may observe the speed and braking distance indications hereinafter set forth.

A tubular standard 24 positioned axially in housing 20, extends through opening 26 formed through the housing and is rigidly secured thereto by nut 28 threaded on the lower off-set end portion of the standard. A secondary housing 30 is secured to the bottom wall 32 of housing 20 by means of screws 34.

This instrument contemplates the use of the magnetic drag unit or speedometer 36, having a rotary mounted shaft 38 interconnected with the flexible speedometer drive shaft 40, which is driven by means (not shown) at a speed proportionate to the ground speed of the automobile.

Shaft 38 carries at its inner end, a bar magnet 42 which rotates therewith within the drag or speed cup 44 which is concentrically positioned within the stationary field cup 46. When magnet 42 is rotated, the drag cup is caused to rotate through a partial revolution to move shaft 48, which is carried by drag cup 44 in axial alignment with shaft 38. This shaft 48 is provided with a hair spring 50 which limits its rotary movement and is also provided with an arm 52 which is forced by the hair spring to engage a stop pin 54 to cause the shaft to normally rest at a fixed starting point. To the outer end of shaft 48 is rigidly affixed a magnet 56, which rotates therewith and facilitates positioning of a magnet 58 affixed to shaft 60 rotatably mounted in a frame 62, which in turn is rotatably mounted on standard 24.

To shaft 38 is rigidly secured for rotation, a worm 64 which engages to drive a worm wheel 66 mounted on shaft 68 that is rotatably mounted in bearing block 70, carried by the secondary housing 30. Shaft 68 is also provided with a worm 72 to operatively engage worm gear 74 fixedly mounted on rotatably mounted shaft 76, which is journalled in parallel relation to shaft 38 in block 70. The upper end of shaft 76 is provided with a spur gear 78 which intermeshes with spur gear 80 to drive shaft 82 mounted for rotation in block 70.

Spur gear 80 is mounted for rotation on shaft 82 and is secured in position by fixed collar 81. The hub of gear 80 is provided with an integral ratchet wheel 83 which is engaged by pawl 85 pivoted to disc 84 which is fixed to shaft 82. When the automobile is driven forward the pawl is urged against ratchet wheel 83 by spring 87 which will cause shaft 82 to be rotated. Should the direction of travel of the automobile be reversed, then the pawl would ride over the ratchet wheel and shaft 82 would not be rotated.

Shaft 82 extends through wall 32 of housing 20 to carry for rotation therewith, an operating disc 84, which is provided with two transversely disposed operating rollers 86 and 88, rotatably mounted on stub shafts 90 carried by disc 84. This disc is constantly rotated when the automobile is in motion and its speed of rotation is in direct proportion to the rate of speed of the vehicle.

Speedometer shaft 38 is also provided with a spur gear 92 which intermeshes with an intermediate spur gear 94, mounted by shouldered screw 96 to bearing block 70. This intermediate idle gear drives gear 98 which is rigidly mounted on shaft 100 of the secondary speedometer 102 to drive this speedometer at a speed corresponding with the speed of speedometer 36. Shaft 100 carries a magnet 104 which rotates within drag cup 106, which in turn is concentrically mounted in stationary field cup 108.

In axial alignment with shaft 100 and extending through standard 24, is a shaft 110 which is secured to drag cup 106 to rotate therewith. This shaft is normally held in the normal position by hair spring 112 with arm 114 engaging stop pin 116.

A stationary disc 118 carried by standard 24 is graduated at 120 to designate miles per hour being traveled by the vehicle, and the indicator hand 121 carried by shaft 110, is adapted to rotate to indicate the current speed being traveled.

The speedometer mechanism above described, is old in the art and serves to time and properly position the parts to indicate the speed of the car at predetermined distances last traveled and to also indicate the distance required to stop the vehicle when being driven at a certain rate of speed.

Referring now to Fig. 4, it will be noted that the frame 62 comprises a hub 122 mounted for rotation on standard 24 and provided with a disc 124 carrying a series of posts 126 which support a ring 128 disposed concentrically with standard 24. A circularly disposed series of equally spaced shafts 60 arranged in parallel relation to standard 24 and concentrically therewith are mounted for rotation in disc 124 and ring 128 of frame 62.

Discs 130 carried by shafts 60 respectively, are graduated at 132 to indicate the current speed of the automobile when set and to maintain said set position for a predetermined distance last traveled by the vehicle. The position of the disc below ring 128 is such that the indicia indicating the rate of speed, will be visible through openings 134 formed through ring 128.

Referring to Figs. 4 and 5, it will be noted that each shaft 60 is provided with a brake wheel 136 against which the brake shoe 138, pivoted at 140 to disc 124, bears to normally hold the shaft 60 and its associated parts against rotation. The spring 142 secured to shoe 138 urges the shoe to the braking position against the brake wheel 136. Outwardly projecting arm 144 integral with shoe 138 travels in a circular path to engage an abutment 146 carried by bottom wall 32 of the housing to release the brake and shaft to permit it to be moved by the magnetic action of magnet 56 at each complete revolution of the frame 62.

The distance of ground travel necessary to move frame 62 through one complete revolution may be predetermined and set at any desired distance. And, since the discs 130 are equally spaced, they will each indicate the speed of travel of the automobile at the position of their respective setting. Each disc will maintain said indicating position substantially through a full revolution of the series.

Referring to Figs. 4 and 10, reference will be had to the means for intermittently rotating frame 62 and its associated parts. It will be noted that a star wheel 148 having equally spaced apart radial arms 150 is secured by rivets 152 to hub 122 for rotation with frame 62. This star wheel is held in spaced relation to the bottom wall 32 by means of a spring washer 154 fitted into the annular groove 156 formed in standard 24. The rollers 86 and 88 carried by disc 84, which is rotated in direct ratio to the speed of the automobile, are so positioned with relation to arms 150 of the star wheel that they will successively engage one of the arms to move the star wheel forward one-eighth (1/8th) of a revolution, since there are eight arms shown.

The number of arms 150 and rollers 86 and 88 could be varied to obtain any desired ratio between the rotation of the star wheel and the rate of ground speed of the automobile. The operating face of each of the arms 150 is provided with a cam 158 for contact with the driving roller, whereby the rate of speed of the star wheel is substantially in uniform ratio with the speed of driving disc 84.

Star wheel 148 is normally secured against rotation by means of detent 160 pivoted at 162 and provided with an arm 164 having a notch 166 into which the end of one of the arms 150 is adapted to rest until pins 86 and 88 engage cam 168 formed on arm 170 of detent 160 to force arm 164 away from arm 150 and permit the star wheel to be rotated by roller 88 or 86.

Magnet 56 is normally held in a fixed position against rotation, but must be released at stated intervals of car travel to permit of its proper positioning to correspond with the current speed of the automobile. This intermittent movement of the magnet is accomplished by means of the following mechanism, best shown in Figs. 9 and 10 and comprising a brake arm 172 pivoted at 174 to bottom wall 32, adapted to be urged by spring 176 against a brake drum 178, rigidly mounted on shaft 48. A cam member 180, integral with arm 172, normally held in the path of travel of rollers 86 and 88, is intermittently operated by said rollers to release the tension of brake arm 172 from drum 178, thus permitting the drag cup to function to set magnet 56 in a position to correspond with the current speed of the automobile. The timing of this magnet setting operation is accomplished and the brake is again set just prior to the operation of the star wheel 148 and the setting of magnet 58 to position disc 130 to indicate the speed as indicated by the set magnet 56. It will be noted that the time of setting disc 130 is made a short distance of travel after the setting of magnet 56, however, since these operations are very close together, there will be very little difference between the speed indication on disc 130 and the actual current speed of the vehicle.

In order to maintain a definite spaced relation between the magnets 56 and 58, rollers 181 mounted on brackets 182, which are secured by means of screws in spaced apart relation to the housing, bottom 32, are adapted to contact disc 124 at all times.

Means for indicating the distance required to stop the automobile traveling from a predetermined speed, by means of its brakes, is best shown in Figs. 1, 4, 12 and 15. Sleeve 184 mounted axially for rotation in standard 24 projects beyond 24 at both ends and encircles shaft 110. Rigidly secured to the upper end of sleeve 184 is a pair of diametrically disposed arms 186 each having transversely disposed end pointers 188 adapted to be moved to contact ring 128 for movement therewith. One of arms 186 is normally positioned at the zero mark 190 on the graduations inscribed on the stationary disc 118, which indicates ground distance traveled by the vehicle during the braking operation. The longitudinal movement of sleeve 184 is accomplished by means of the following mechanism controlled by the foot brake lever 194, shown diagrammatically in Fig. 4:

A solenoid 196 secured to bottom wall 32 and having a coil 198 and a movable core 200, normally held in the extended position by coil spring 202, is operable through connecting link 204 and bellcrank lever 206, which is mounted on bracket 208 secured to bottom 32 to engage the annular ring 210 integral with sleeve 184 to move the same as the solenoid is energized, thereby causing end pointers 188 to engage ring 128 and rotate sleeve 184 together with its associated parts. An arm 212 extending radially from ring 210 is adapted to engage stop pin 214 when end pointer 188 registers with zero 190. An extension spring 216 secured at its one end to a post 218 mounted in bottom wall 32 and at its other end to arm 212, normally holds arm 212 against stop pin 214 but yields sufficiently to permit sleeve 184 to be rotated when the pointers 188 engage ring 128.

The electrical connection between the brake pedal and the solenoid is as follows:

A battery 220 is connected by wire 222 at its one terminal to one contact point 224 carried by the brake lever 194, which is adapted to contact resilient contact point 226. The other terminal of battery 220 is connected by wire 228 through signal lamp 230 to one side of coil 198. The other side of coil 198 is connected by means of wire 232 to wire 228 adjacent battery 220. A switch 234 is positioned in live wire 232 whereby the circuit is controlled.

The resilient contact member 226 is interconnected by wire 235 to wire 228.

When switch 234 is closed and the brake foot lever is depressed to move point 234 in contact with contact member 226, the current from battery 220 will energize coil 198 and cause the core to move inwardly against the compression spring 202, thus causing sleeve 184 to be moved horizontally to set the pointers 188 and cause the sleeve to rotate.

It will be noted that arm 186 registers with the zero mark on the stationary disc 118 and that at the instant the brake lever 194 is operated, arm 186 starts rotating with ring 128, which rotates in direct proportion to the ground travel of the vehicle, thus indicating by the position at stopping of the arm on graduations 190, the distance of travel during the braking operation.

Since it is desired to maintain the end pointers 188 in operative engagement with ring 128 for a predetermined distance of ground travel, regardless of the position of the brake lever 194, the following mechanical means is provided:

As shown in Figs. 14 and 15, the hub 236 of arms 184 is provided in its periphery with spaced apart notches 238 and 240. A stationary bracket 242 carried by plate 118 has a tooth 244 which registers with notch 238 when the sleeve 184 is in the normal position, so that when the sleeve is moved downwardly as described above, hub 236 will pass below tooth 244 and then as the sleeve is rotated, the tooth will engage the top side of hub 236 and hold the pointers 188 in operative contact with ring 128 until the hub 236 rotates far enough so that the tooth 244 will register with notch 240 when the sleeve will be forced upwardly to its normal position by the action of spring 202 to force bellcrank lever 206 against collar 246, which is integral with sleeve 184. It should be noted that arms 186 are somewhat resilient and will slightly flex when the ends 188 thereof contact ring 128.

The distance between notches 238 and 240 is such that the entire range of graduations 190 may be utilized in the braking operation before the indicating arm 186 will return to the normal position. Should the distance required for stopping be less than the 330 ft. as indicated at 190, then the arm 186 will not return to the starting point until the vehicle is again operated for a distance to make up the deficiency. For a further convenience of indicating the starting point of arm 186, projecting tooth 248 is provided at the periphery of disc 118.

To properly determine the efficiency of the vehicle brakes, it is necessary to know the speed of travel of the automobile, as indicated on the disc 130, which is properly associated with the indicating arm 186 at the time of setting the brake. The positions of these parts, as shown in Fig. 1, are represented at time of setting the brake.

When the brake is thus set, arm 186 will travel with ring 128 and will be pointing toward the numeral 40, and, for example, if it requires 132 ft. to stop the car, this distance will be indicated on the graduation 190 by said arm 186. Thus showing at a glance, that the brake was set when the car was at a speed of 40 mi. and that it required a distance of 132 ft. to stop the car.

Since it is desirable to have some signal to indicate to the driver the time that the arm 186 and the speed indicating numeral are in proper relation for braking, a mechanical bell or gong 250 is provided.

Referring to Figs. 2 and 11, it will be observed that shaft 82 extends through secondary housing 30 and is provided with a cam 252 which rotates with said shaft in timed relation with the speed of the vehicle. An arm 254 pivoted at 256 to housing 30 has a clapper 258 at its free end positioned to strike the bell member 260 mounted on housing 30. This clapper is urged toward bell 260 by a spring 262 which is associated therewith. Arm 254 has a ratchet tooth 264 against which cam 252 travels in its rotary movement to force the clapper away from the bell, and when the cam leaves the tooth, spring 262 will cause the clapper to strike the bell and cause an audible signal for the operator to set his foot brake pedal.

An adjustable stop 265 consisting of a rod 266 mounted for longitudinal movement in bearings 268 carried by housing 30, is provided with an annular groove 270 into which a flexible spring member rests to preclude accidental movement of rod 266 when the rod is positioned in the path of travel of arm 254 to prevent ringing of the bell. When it is desired to ring the bell, the operator engages button 272 on rod 266 to pull it outwardly a distance sufficient to move it out of the path of travel of arm 254.

Since it is a known fact that the time of response to a signal varies with the different drivers, it is found convenient to sound the gong slightly ahead of the registering of arm 186 with the speed indicating numeral on the disc 130 in order to obtain a more accurate register. Should these parts be slightly out of register, the only defect would be the possible change in the speed of the car during the time required to set the brake after the signal is sounded, which would necessarily be very slight.

In making the brake test the operator waits until he hears the gong which sounds substantially as the disc is changed then he sets the brake and the indicator 186 moves along the scale 190 to indicate the distance required to stop the automobile. The operator now refers to the speed the car was traveling at the time the brake was set as indicated on the disc adjacent the indicator 186.

The usual cumulative indication of total miles traveled is provided for the in the following mechanism:

An internal ring gear 274 concentrically mounted on rotary disc 124 intermeshes with a spur gear 276 rotatably mounted in bearing 278 (Fig. 5). Worm 280 is in operative relation with worm gear 282, which in turn is rigidly affixed to shaft 284 of the cumulator 286 so that as the disc 124 is rotated in direct response to the ground speed of the automobile, the total number of miles traveled will be indicated on the cumulator through the window 288 formed through disc 118 to which the cumulator is attached.

For the purpose of eliminating the end thrust on shafts 48 and 60, due to magnetic pull between magnets 56 and 58, a hardened thrust plate 290 is axially positioned on magnet 56 against which bears the rounded end portion 292 of shaft 60—this structure eliminates most of the friction due to the magnetic end thrust and makes it possible to obtain more exact readings of the ground speed indicators.

The operation of the speed and brake distance indicator is as follows: When the automobile is in motion, shaft 42 is rotated by means responsive to the speed of the automobile. The rotary frame 62 carrying the speed indicating members 130 is simultaneously rotated at a speed proportionate to the ground speed of the automobile and makes one complete revolution in a predetermined distance of vehicle travel so that the interval between adjacent indicating members 130 will correspond to a predetermined distance of ground travel. In the present showing the predetermined distance is 330 feet; however, this distance could be easily varied by changing the gearing, spacing, etc. By means of this device, each of the indicating members is set to indicate the current speed of the automobile and retains that setting during its travel throughout substantially a full revolution of the ring assembly, thus making it possible for the operator to determine the speed of travel of the automobile at given intervals for substantially a half mile of travel.

A stationary disc 118 graduated at 120 serves to indicate the speed of the automobile as the indicator hand is moved thereover by the shaft 110. The shaft carrying each of the speed indicating members 130 is provided with a brake means which normally holds the indicating member against rotation. However, means is provided to release said brake so as to permit the indicating member 130 to be set as its associated magnet moves into the effective magnetic field of the setting magnet 56. By this means each of the indicating members 130 will be set to indicate the speed of travel of the automobile at the position of their respective settings, and each indicating member will maintain its position substantially throughout a full revolution of the series of discs. The star wheel 148 rigidly secured to rotatable frame 62 is driven intermittent to move the series of discs forwardly one step each time. At each movement of the indicating members one of the members 130 is released then set by magnet 56 to indicate the current speed of the automobile.

The means indicating the distance required to stop the automobile from a predetermined speed of travel is best shown in Figs. 1, 4, 12 and 15 and includes a manually operable switch lever 194 which causes the pointers 188 of arms 186 to engage ring 128 and move therewith over the graduated indicia 190. The arm 186 normally stands at zero on indicia 190 and the number of feet traveled during the braking operation will be indicated by the position of the arm 186 as indicated by the indicia.

Mechanism, best shown in Figs. 14 and 15, is provided to maintain the pointers 188 in operative engagement with ring 128 for a predetermined distance of ground travel of the automobile so as to make it possible to have sufficient time to observe the braking distance when the car comes to a stop after braking. It is quite apparent that when the brake is manually caused to set notched disc 236, said disc will drop below bracket 242 and ride there-below to force pointer 188 against ring 128. This position of the parts will obtain until the bracket 242 registers with notch 244 in disc 236 when the pointer 188 will be released and the arm 186 will automatically return to register with the zero on indicia 190.

To indicate the proper time for setting the brake, it is found convenient to indicate by an audible signal the time that arm 186 is in register with indicia 132 carried by indicating members 139. By setting the brake when the arm 186 is in alignment with said indicia 132, the arm and indicia will travel in this registered relation so that the speed at which the automobile was traveling when the brake was set will be definitely indicated. Furthermore, the number of feet required to stop the automobile will be indicated on the stationary disc by indicia 190.

As many changes could be made in carrying out the above structure without departing from the spirit of the invention, it is desired to be limited only by the terms of the appended claims.

Having thus described the invention, what is claimed as new and desired to be secured by Letters Patent is:

1. In a speed and brake distance indicator for automobiles a shaft driven proportionately to the ground speed of the car; a magnetic drag unit driven by said driven shaft; a rotatably mounted ring driven by said driven shaft; a series of rotatably mounted speed indicating discs carried by said ring which are adapted to be successively and independently set at spaced apart unit distances of travel of said automobile by means controlled by said magnetic drag unit to indicate the then current speed of the automobile; braking distance indicating means driven by said driven shaft through said rotatably mounted ring when the automobile brake is manually set whereby the braking distance is indicated; and means operable to frictionally maintain said braking distance means in the indicating position when the automobile comes to rest.

2. In a speed and braking distance indicator for automobiles, a shaft driven proportionately to the ground speed of the automobile; a magnetic drag unit driven by said driven shaft; a rotatably mounted ring driven by said driven shaft; a series of rotatably mounted speed indicating discs carried by said ring which are adapted to be successively and independently set at spaced apart unit distances of automobile travel by magnetic means controlled by said magnetic drag unit to indicate the then current speed of the automobile; a signalling means operable by said driven shaft as each disc is set; braking distance indicating means driven by said driven shaft through said rotatably mounted ring whereby the braking distance required to stop the automobile from the last current speed indicated by the last said disc is indicated; and means to maintain said braking distance indicating means in the indicating position when the automobile comes to rest.

3. In a speed and braking distance indicator for automobiles a shaft driven proportionately to the ground speed of the automobile; a magnetic drag unit driven by said driven shaft; a rotatably mounted ring driven by said driven shaft; a series of rotatably mounted speed indicating discs carried by said ring which are adapted to be successively and independently set at equal spaced apart unit distances of travel of said automobile by means controlled by said magnetic drag unit to indicate the then current speed of the automobile; signalling means operable by said driven shaft as each disc is set; braking distance indicating means driven by said driven shaft through said rotatably mounted ring when the automobile brake is manually set whereby the braking distance is indicated; manually controlled means in operative relation with the automobile brake setting means whereby the brake distance indicating means is inter-connected with and driven by said rotatably mounted ring; and releasable means to maintain said braking distance indicating means in the indicating position when the automobile comes to rest.

HERBERT F. MORLEY.
ROY E. GEARHART.